United States Patent
Miller (10) Patent No.: US 11,541,366 B2
(45) Date of Patent: *Jan. 3, 2023

(54) METHOD FOR INSTALLING A THERMOCOUPLE INSIDE A REACTOR TUBE FILLED WITH CATALYST

(71) Applicant: Air Liquide Large Industries U.S. LP, Houston, TX (US)

(72) Inventor: Gary D. Miller, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 553 days.

This patent is subject to a terminal disclaimer.

(21) Appl. No.: 16/665,330

(22) Filed: Oct. 28, 2019

(65) Prior Publication Data

US 2020/0256739 A1 Aug. 13, 2020

Related U.S. Application Data

(60) Provisional application No. 62/802,860, filed on Feb. 8, 2019.

(51) Int. Cl.
*B01J 4/00* (2006.01)
*B01J 8/00* (2006.01)
(Continued)

(52) U.S. Cl.
CPC .......... *B01J 8/001* (2013.01); *B01J 8/003* (2013.01); *B01J 8/0015* (2013.01); *B01J 8/065* (2013.01);
(Continued)

(58) Field of Classification Search
CPC ..... B01J 4/00; B01J 4/001; B01J 4/005; B01J 8/001; B01J 8/0015; B01J 8/002;
(Continued)

(56) References Cited

U.S. PATENT DOCUMENTS 7,517,147 B2 * 4/2009 Park .................... B01J 8/06
374/208
7,836,919 B2 * 11/2010 Johns .................. B01J 8/003
422/219
(Continued)

FOREIGN PATENT DOCUMENTS

DE   10 2016 007724   12/2017
WO   WO 2011 012875   3/2011

OTHER PUBLICATIONS

International Search Report and Written Opinion for corresponding PCT/US2020/057688, dated Jan. 15, 2021.
(Continued)

*Primary Examiner* — Natasha E Young
(74) *Attorney, Agent, or Firm* — Elwood L. Haynes (57) ABSTRACT

A method of installing a temperature measuring device inside a reactor tube while filling the tube with catalyst is provided. The method includes inserting a positioning system, including a single inflatable bladder connected at a central location to a centering ring, into a reactor tube, the reactor tube comprising a distal end and a proximal end. Then inserting the centering ring around the temperature measurement device. Then locating the positioning system at a first predetermined distance from the distal end, and inflating the single inflatable bladder, thereby centering the centering ring and the temperature measurement device within the SMR tube. Then introducing catalyst into the SMR tube, thereby enclosing the temperature measurement device in catalyst.

11 Claims, 6 Drawing Sheets

(51) Int. Cl.
*B01J 8/06* (2006.01)
*B01J 19/00* (2006.01)
*B01J 19/24* (2006.01)
*G01K 1/02* (2021.01)
*G01K 1/14* (2021.01)
*G21C 17/112* (2006.01)
*G01K 7/02* (2021.01)

(52) U.S. Cl.
CPC ............... *G01K 1/026* (2013.01); *G01K 1/14* (2013.01); *G01K 7/02* (2013.01); *G21C 17/112* (2013.01); *B01J 2208/00061* (2013.01); *B01J 2208/00752* (2013.01)

(58) Field of Classification Search
CPC ... B01J 8/003; B01J 8/0045; B01J 8/02; B01J 8/0242; B01J 8/025; B01J 8/0257; B01J 8/0285; B01J 8/06; B01J 8/065; B01J 8/067; B01J 19/00; B01J 19/24; B01J 19/2415; B01J 2208/00; B01J 2208/00008; B01J 2208/00017; B01J 2208/00026; B01J 2208/00035; B01J 2208/00044; B01J 2208/00061; B01J 2208/00106; B01J 2208/00168; B01J 2208/00212; B01J 2208/0023; B01J 2208/00743; B01J 2208/00752; B01J 2208/00769; B01J 2208/00778; B01J 2208/06; B01J 2219/00; B01J 2219/24; C01B 3/00; C01B 3/02; C01B 3/32; C01B 3/34; C01B 3/38; C01B 3/384; C01B 2203/00; C01B 2203/02; C01B 2203/0205; C01B 2203/0227; C01B 2203/0233; C01B 2203/16; C01B 2203/1614; C01B 2203/1619; G01K 1/00; G01K 1/02; G01K 1/026; G01K 1/14; G01K 1/146; G01K 7/00; G01K 7/02; G01K 7/04; G21C 17/00; G21C 17/10; G21C 17/108; G21C 17/112
See application file for complete search history.

(56) References Cited

U.S. PATENT DOCUMENTS

| | | | |
|---|---|---|---|
| 9,056,295 B2* | 6/2015 | Brightling | B01J 8/003 |
| 9,573,106 B2* | 2/2017 | Whittenberger | B01J 19/32 |
| 2007/0098605 A1 | 5/2007 | Johns et al. | |
| 2007/0116090 A1 | 5/2007 | Park et al. | |
| 2014/0356109 A1 | 12/2014 | Whittenberger et al. | |
| 2016/0161346 A1* | 6/2016 | Schorb | G01K 1/14 |
| | | | 374/161 |
| 2020/0254412 A1* | 8/2020 | Miller | B01J 8/025 |

OTHER PUBLICATIONS

International Search Report and Written Opinion for related PCT/US2020/057673, dated Mar. 12, 2021.
International Search Report and Written Opinion for related PCT/US2020/057694, dated Jan. 14, 2021.
International Search Report and Written Opinion for related PCT/US2020/057705, dated Jan. 14, 2021.

* cited by examiner

METHOD FOR INSTALLING A THERMOCOUPLE INSIDE A REACTOR TUBE FILLED WITH CATALYST

CROSS REFERENCE TO RELATED APPLICATIONS

This application claims the benefit of priority under 35 U.S.C. § 119 (a) and (b) to U.S. Provisional Application No. 62/802,860, filed Feb. 8, 2019, the entire contents of which are incorporated herein by reference.

BACKGROUND

A steam methane reformer (SMR) is an industrial apparatus that utilizes heat, pressure, and a catalyst to convert methane ($CH_4$) and steam ($H_2O$) into hydrogen ($3H_2$) and carbon monoxide (CO). The $CH_4$ and $H_2O$ react with each other in catalyst-filled tubes that are enclosed within a furnace which provides heat to the endothermic reaction that forms $H_2$ and CO. In order for this endothermic reaction to proceed, a very high furnace temperature is required. Typically, the temperature will be within 700-1,000° C. (1,292-1,832° F.), while the pressure may typically range from 3 to 25 bar.

Some companies manufacture thermocouples that can be inserted into SMR tubes, by which the temperature can be measured along the length of the tube. Knowing this inside-of-SMR-tube temperature is valuable, so that the SMR reaction can be monitored, the process can be optimized, and the tube failure can be predicted.

Installing these inside-of-SMR-tube thermocouples can be challenging because they need to be installed before catalyst is installed around them.

This invention outlines a method by which the inside-of-reactor tube thermocouple is installed and centered, and then catalyst is loaded into the tube afterwards.

SUMMARY

A method of installing a temperature measuring device inside a reactor tube while filling the tube with catalyst is provided. The method includes inserting a positioning system, including a single inflatable bladder connected at a central location to a centering ring, into a reactor tube, with the reactor tube comprising a distal end and a proximal end. Then inserting a centering ring around the temperature measurement device. Then locating the positioning system at a first predetermined distance from the distal end, and inflating the single inflatable bladder, thereby centering the centering ring and the temperature measurement device within the SMR tube. Then introducing catalyst into the SMR tube, thereby enclosing the temperature measurement device in catalyst.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

101=steam methane reformer tube
102=tube inner surface
103=centering ring
105=single inflatable bladder
106=temperature measurement device
107=pressurized gas conduit
111=single bladder positioning system (including centering ring 103 and single inflatable bladders 105)
112=catalyst
113=bottom (distal end) of the reactor tube
114=top (proximal end) of the reactor tube
116=centering ring tether
117=vibration device
118=compressed gas source
119=compressed gas source valve
120=catalyst sock
121=catalyst sock tether
122=compressed air bleed valve
123=distal end mesh disk

DESCRIPTION OF PREFERRED EMBODIMENTS illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The term "about 1 foot" means as close to one foot as is reasonable given the conditions. As used herein, "about 1 foot" is defined as meaning 12 inches plus or minus 20%. Likewise, "about 5 feet" is defined as 60 inches plus or minus 20%.

The term "essentially vertical orientation" means as close to vertical as is reasonable given the conditions. The term "essentially vertical orientation" means sufficiently vertical such that the performance of the instant invention, from the perspective of one with ordinary skill in the art, is the same as if the tubes were precisely vertical. As used herein, "essentially vertical orientation" is defined as within 10 degrees from true vertical, preferably within 5 degrees of true vertical.

As an overview, a method is provided that uses a sock catalyst loading technique. A centering ring is centered within the reformer tube using a single inflatable bladder that will allow the catalyst to collect on the upper surface, then fall into the lower empty space of the reactor tube once deflated. To start, the bladder is positioned above the tube's catalyst layer. Or, if the tube is completely empty, the bladder is positioned above the end of the tube. The distance above the tube end (or catalyst layer) may vary, but about 12 inches is typical. The bladder is inflated, typically using nitrogen or dry service air. Then a "sock loading" technique is used to introduce the catalyst to the surface of the bladder. After the bladder is deflated and the catalyst fills the void beneath, the bladder is then repositioned, typically 1 foot above catalyst layer, and the process is repeated until the tube is fully loaded with catalyst.

Figure 1:
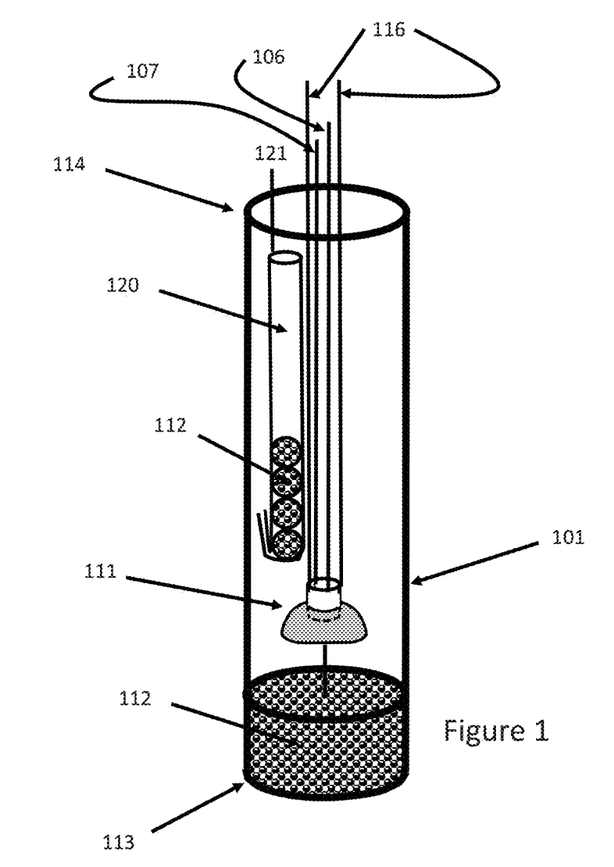
FIG. 1 is a schematic representation of a cross-sectional view of a reactor tube and the centering ring, in accordance with one embodiment of the present invention.
Figure 2:
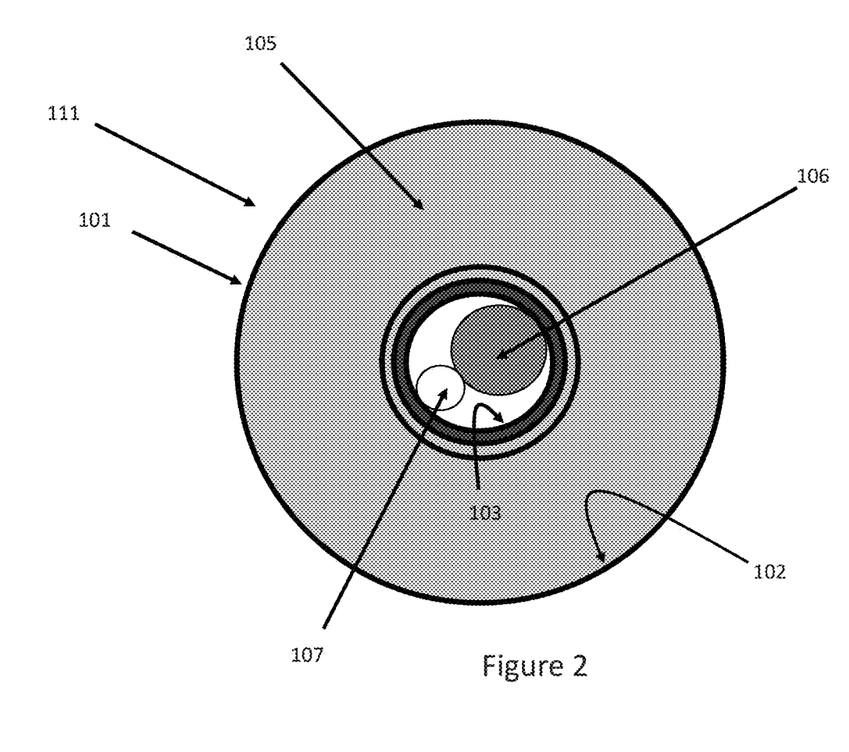
FIG. 2 is a schematic representation of a cross-sectional view of a reactor tube and inflated single bladder positioning system, in accordance with one embodiment of the present invention.
Figure 3A:
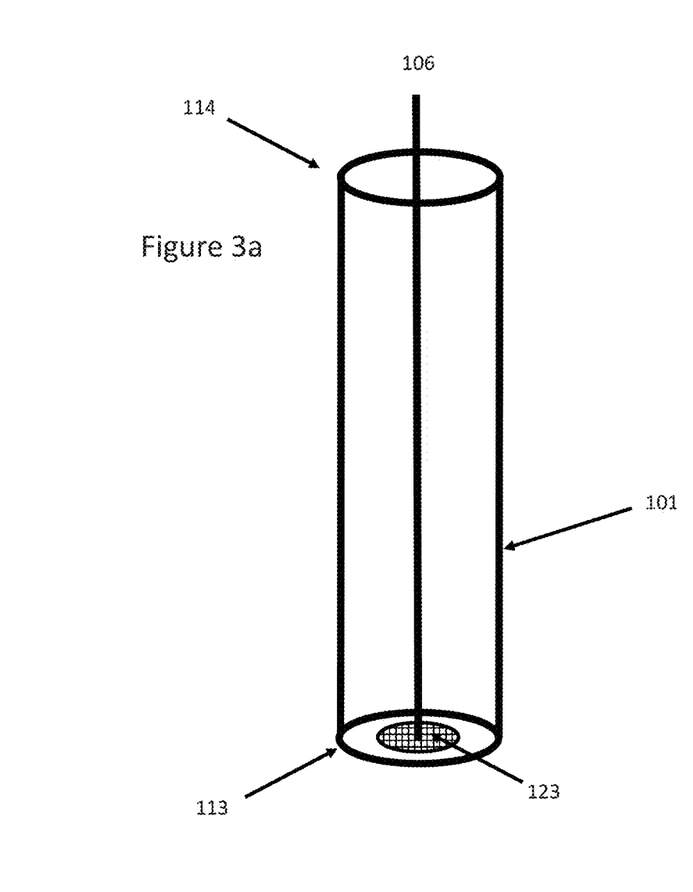
FIG. 3a is a schematic representation of a cross-sectional view of a reactor tube with a single temperature measurement device, in accordance with one embodiment of the present invention.
Figure 3B:
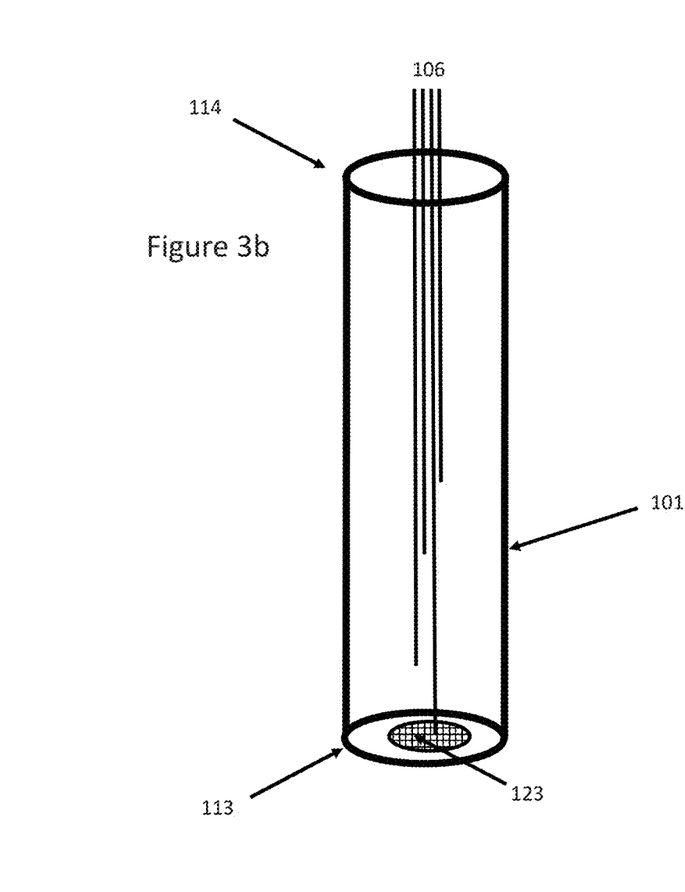
FIG. 3b is a schematic representation of a cross-sectional view of a reactor tube with a strand of multiple temperature measurement devices, in accordance with one embodiment of the present invention.
Figure 4:
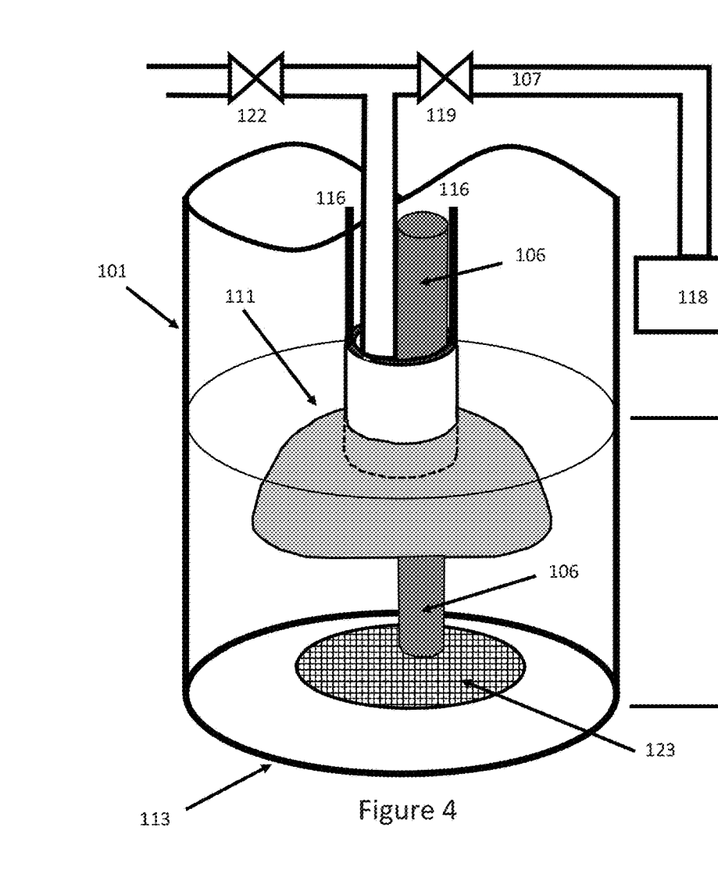
FIG. 4 is a schematic representation of an isometric view of the uninflated single bladder positioning system located in a reactor tube, in accordance with one embodiment of the present invention.

FIG. 1 represents a cross-sectional view of reactor tube 101 utilizing the instant device and method. The reactor tube may be a steam methane reformer (SMR) tube. Inflatable bladder 105 is attached to, and preferably spaced evenly around, the perimeter of centering ring 103. As indicated in FIG. 2 (cross-sectional view, inflated), for ease of explanation, this assembly will be referred to as single bladder positioning system 111.

Within centering ring 103 are at least temperature measurement device 106 and pressurized gas conduit 107. Pressurized gas conduit 107 introduces and evacuates the gas used to inflate and deflate single inflatable bladder 105. Pressurized gas conduit 107 connects directly with single inflatable bladder 105, thus allowing it to be inflated and deflated.

Figure 5:
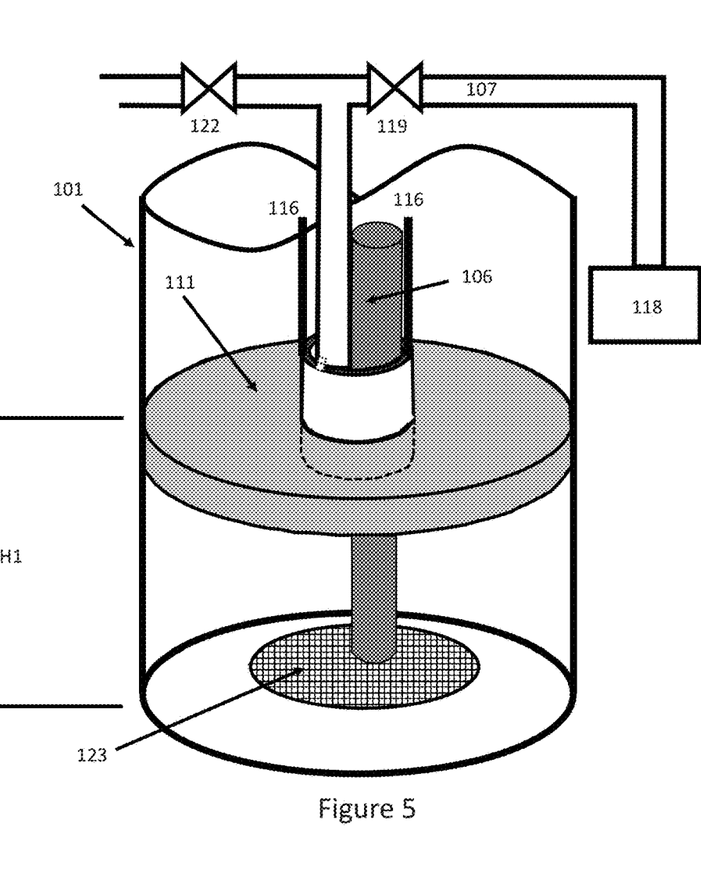
FIG. 5 is a schematic representation of an isometric view of the inflated single bladder positioning system located in a reactor tube, in accordance with one embodiment of the present invention.
Figure 6:
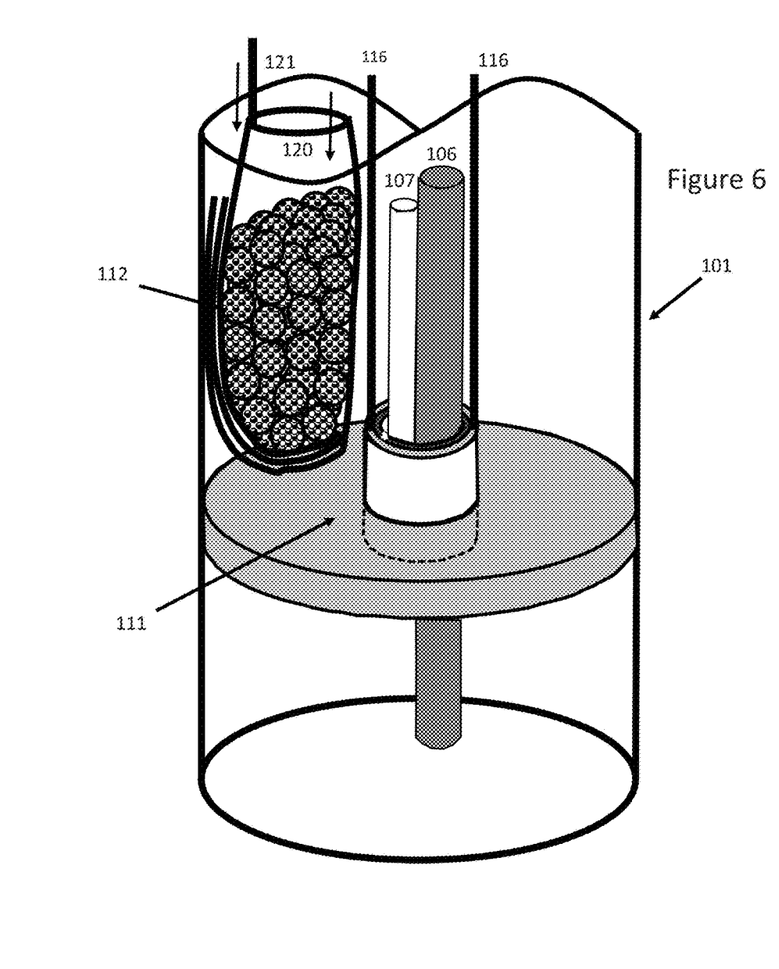
FIG. 6 is a schematic representation of an isometric view of the inflated single bladder positioning system located in a reactor tube indicating the lowering of the sock containing catalyst into the tube, in accordance with one embodiment of the present invention.
Figure 7:
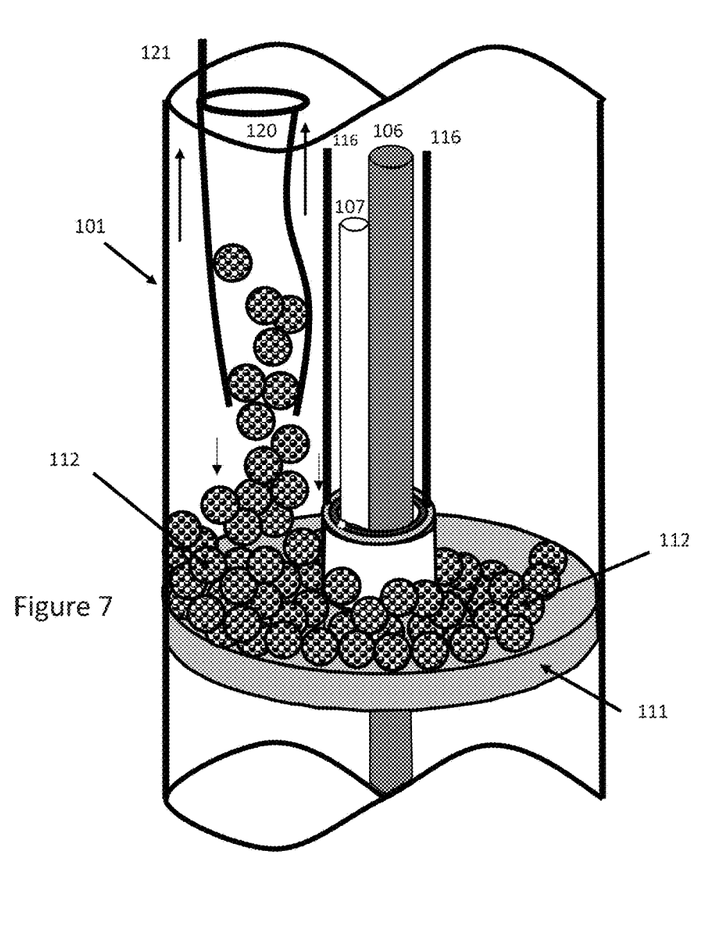
FIG. 7 is a schematic representation of an isometric view of the inflated single bladder positioning system located in a reactor tube indicating the introduction of catalyst into the tube from the sock, in accordance with one embodiment of the present invention.
Figure 8:
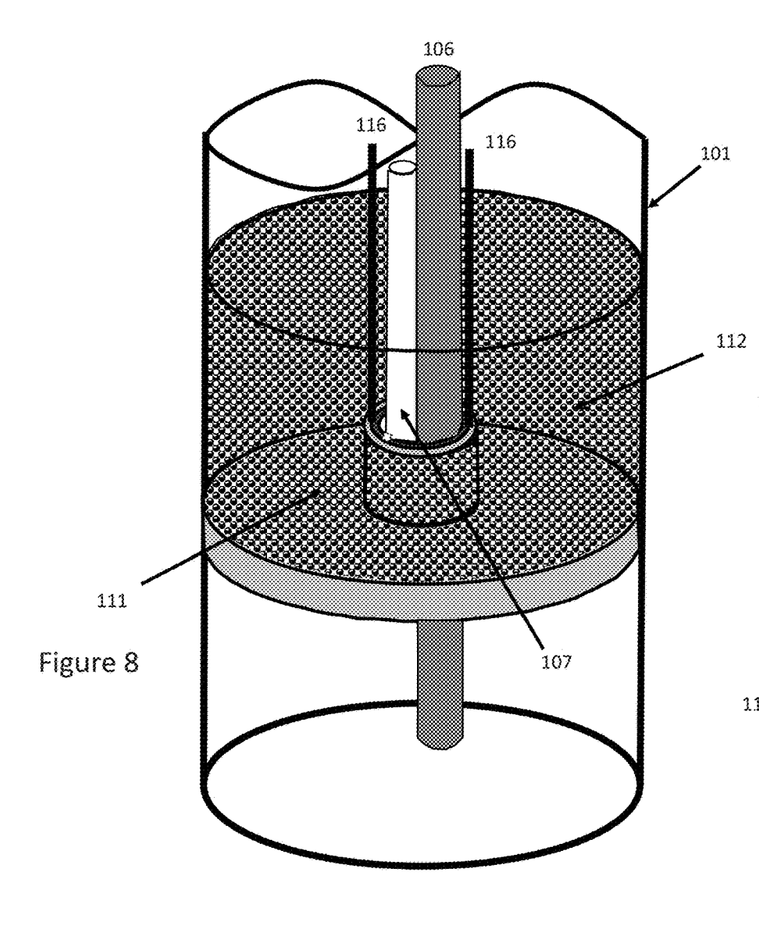
FIG. 8 is a schematic representation of an isometric view of the inflated single bladder positioning system located in a reactor tube after catalyst introduction is complete, in accordance with one embodiment of the present invention.
Figure 9:
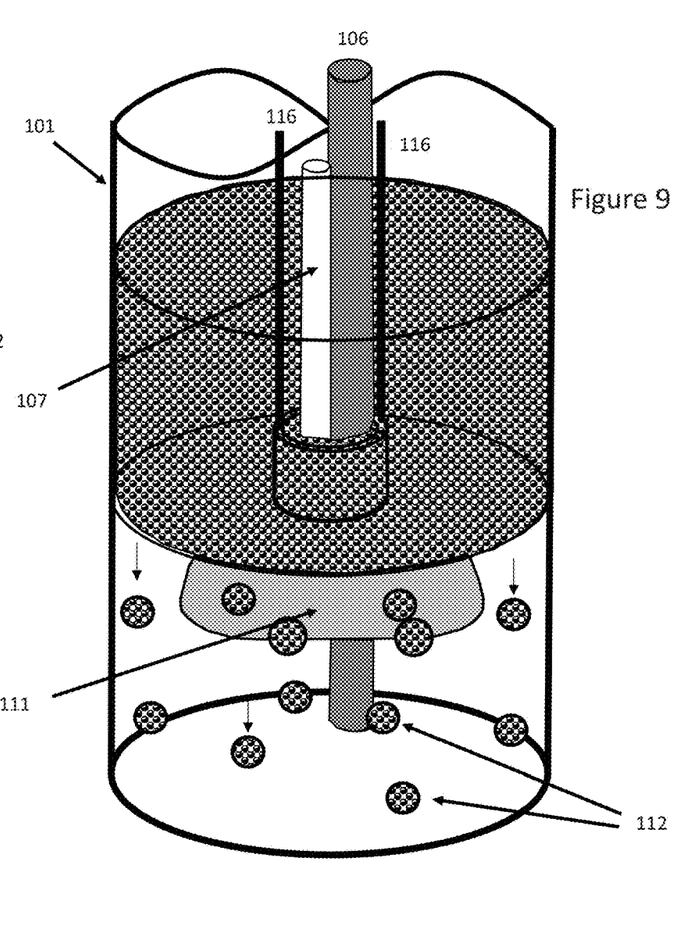
FIG. 9 is a schematic representation of an isometric view of the deflated single bladder positioning system located in a reactor tube with the catalyst falling to the volume below, accordance with one embodiment of the present invention.
Figure 10:
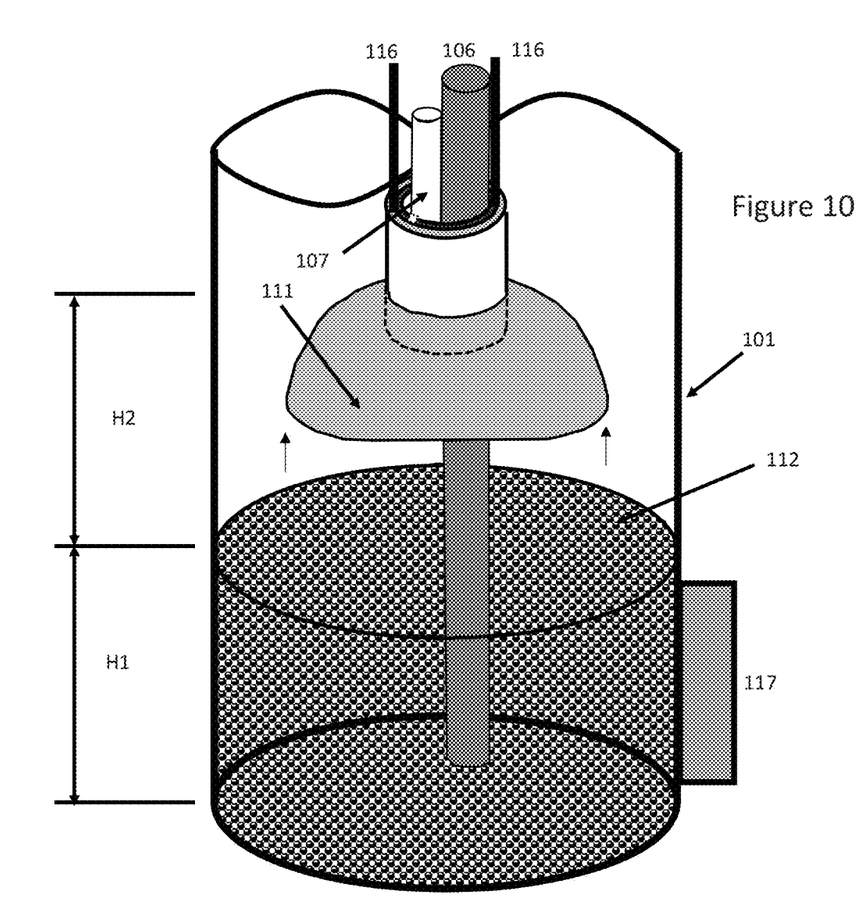
FIG. 10 is a schematic representation of an isometric view of the uninflated single bladder positioning system being relocated to the next position within the reactor tube, in accordance with one embodiment of the present invention.

When inflated (as indicated in FIG. 5), single inflatable bladder 105 makes at least partial contact with tube wall inner surface 102 and acts to locate centering ring 103 centrally within tube wall inner surface 102. Temperature measurement device 106 is located inside of centering ring 103, and after the inflation of single inflatable bladder 105 is also positioned near the axial center of reactor tube 101. Although only one temperature measurement device 106 is indicated in the figures, it is understood that two or more temperature measurement devices 106 may be located inside centering ring 103 (not shown).

This embodiment may be better understood with reference to FIGS. 1-10.

Before the filling of reactor tube 101 with catalyst may commence, the tube is positioned in an essentially vertical orientation, and a sieve (not shown) has been located at distal end 113 of reactor tube 101, in order to keep catalyst 112 within reactor tube 101. It is preferred that the inside of reactor tube 101 be inspected to ensure that undesired objects or foreign material not be present. In some cases, a Boroscope (not shown) is used to determine that the inside of reactor tube 101 is clean.

First, temperature measurement device 105 is attached to distal end mesh disk 123. This helps secure temperature measurement device in place when catalyst 112 is loaded above it. This keeps temperature measurement device 105 from migrating up reactor tube 101 during the subsequent steps.

Starting at proximal end 114, temperature measurement device 106 is then inserted down the length of empty reactor tube 101. Temperature measurement device 106 and pressurized gas conduit 107 are inserted into the center of centering ring 103, and centering ring tether 116 is attached to centering ring 103. While two centering ring tethers 116 are shown in the figures, temperature measurement device 106 may be fitted with one or multiple centering ring tethers 116. Pressurized gas conduit 107 may be inserted through centering ring 103, or pressurized gas conduit 107 may not be inserted through centering ring 103. Pressurized gas conduit 107 may be left outside centering ring 102 if desired (not shown). Then, while holding and extending centering ring ether 116, lower single bladder positioning system 111 into reactor tube 101. Then lower single bladder positioning system 111 until it touches the bottom of reactor tube 101. At this time, it is recommended that centering ring tether 116 is marked to indicate the level at proximal end 114 of the tube, as a point of reference.

Single bladder positioning system 111 is then raised a first distance H1 from the end of reactor tube 101. H1 is entirely discretionary, but a typical value would be about one foot. This distance may be determined from the mark previously made on centering ring tether 116. An additional reference mark may be made at this time on centering ring tether 116 with reference to proximal end 114, to indicate the new location of single bladder positioning system 111.

Single inflatable bladder 105 is inflated, by closing valve 122 and opening valve 107, thereby at least partially contacting tube wall inner surface 102 and locating centering ring 103 centrally within reactor tube 101. Any available and suitable compressed gas source 118 may be used for inflating the bladders, such as compressed nitrogen or dry service or plant air.

Temperature measurement device 106, which may be approximately the same length as reactor tube 101, is essentially centered within reactor tube 101. Catalyst sock 120 is loaded with a predetermined, or calculated amount of catalyst 112. Catalyst sock 120 is introduced into reactor tube 101 by conforming it around temperature measurement device 106 and pressurized gas conduit 107. It is recommended that catalyst sock 120 has approximately 2 inches of overlapping fold.

As catalyst sock 120 is then lowered, tension must be kept on both centering ring tether 116 and pressurized gas conduit 107, in order to allow catalyst sock 120 to pass down reactor tube 101. Catalyst sock 120 is lowered until it reaches, or is in near proximity to, single bladder positioning system 111. It is important that the release point is close to single bladder positioning system 111, in order to reduce any damage to the falling catalyst. Catalyst sock 120 is then unloaded of catalyst 112. This is done by quickly tugging on the sock and releasing the overlapping fold. The empty sock is then removed from reactor tube 101. It is understood that this is an illustrative, but non-limiting, example of a method of sock loading a reactor tube. Other methods of sock loading known to the art may also be used with the instant method and device.

As catalyst 112 is emptied, it collects on top of single inflatable bladder 105. Single inflatable bladder 105 is then deflated by closing valve 107 and opening valve 122. Catalyst 112 falls into the void below and is allowed to settle in and around centering ring 103 and temperature measurement device 106, thus maintaining their central position. In order to promote better catalyst packing, and to help avoid unwanted voids in the catalyst, reactor tube 101 may be vibrated using a vibration device 117.

Catalyst sock 120 is then refilled with a predetermined amount of catalyst. Single bladder positioning system 111 is the raised a predetermined distance H2 and the process is repeated. Predetermined distance H2 may be any distance useful or meaningful to the installer, for example one foot. Again, this distance may be determined from the mark previously made on centering ring tether 116, and an additional reference mark may be made at this time on centering ring tether 116.

This process is repeated to the desired location within reactor tube 101, which may be a desired distance from the top of the tube. Reactor tube 101 is now fully reloaded and full of fresh catalyst, and temperature measurement device 106 is centrally located and able to provide accurate and meaningful readings of temperature along the length of reactor tube 101.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of installing a temperature measuring device inside a reactor tube while filling the tube with catalyst, comprising:
   a) inserting a positioning system, comprising a single inflatable bladder connected at a central location to a centering ring, into the reactor tube, the reactor tube comprising a distal end and a proximal end,
   b) attaching the temperature measurement device to a distal end mesh disk,
   c) inserting the centering ring around the temperature measurement device,
   d) locating the positioning system at a first predetermined distance from the distal end,
   e) inflating the single inflatable bladder, thereby centering the centering ring and the temperature measurement device within the reactor tube, and
   f) introducing catalyst into the reactor tube, thereby enclosing the temperature measurement device in catalyst,
   wherein the catalyst is introduced into the reactor tube with a catalyst sock.

2. The method of claim 1, further comprising:
   a) deflating the single inflatable bladder and relocating the positioning system a second predetermined distance toward the proximal end, and
   b) repeating steps b)-f) until the reactor tube is filled as required.

3. The method of claim 1, wherein the temperature measurement device is a thermocouple.

4. The method of claim 1, wherein the temperature measurement device is a stand of multiple thermocouple sensors.

5. The method of claim 1, wherein the single inflatable bladder is inflated using pressurized nitrogen.

6. The method of claim 1, wherein the single inflatable bladder is inflated using pressurized air.

7. The method of claim 1, wherein the reactor catalyst tube is vibrated during or after step e).

8. The method of claim 1, wherein the first predetermined distance is less than about 5 feet.

9. The method of claim 1, wherein the first predetermined distance is about 1 foot.

10. The method of claim 2, wherein the second predetermined distance is less than about 5 feet.

11. The method of claim 2, wherein the second predetermined distance is about 1 foot.

* * * * *